United States Patent [19]

Kemming

[11] Patent Number: 4,921,152
[45] Date of Patent: May 1, 1990

[54] COMBINATION STORAGE CONTAINER AND MOTORCYCLE HOLDER

[76] Inventor: Charles L. Kemming, 862 Orchard Rd., Montrose, Colo. 81401

[21] Appl. No.: 398,892

[22] Filed: Aug. 28, 1989

[51] Int. Cl.⁵ .............................................. B60R 9/00
[52] U.S. Cl. .............................. 224/42.42; 224/42.32; 211/5
[58] Field of Search .................. 224/42.42, 273, 42.11, 224/42.13, 42.32, 42.33, 42.45 R; 211/5, 17, 20, 22, 23

[56] References Cited

U.S. PATENT DOCUMENTS

| | | | |
|---|---|---|---|
| 3,749,295 | 7/1973 | Palmer | 224/42.03 B |
| 3,820,662 | 6/1974 | Steers | 211/5 |
| 3,827,773 | 8/1974 | Aiello | 211/5 |
| 3,970,197 | 7/1976 | Bale, Jr. | 211/5 |
| 4,275,981 | 6/1981 | Bruhn | 224/42.03 B |
| 4,288,011 | 9/1981 | Grossman | 224/42.42 |
| 4,437,597 | 3/1984 | Doyle | 224/42.45 R |
| 4,488,669 | 12/1984 | Waters | 224/42.42 |

Primary Examiner—Lynda J. Sholl
Attorney, Agent, or Firm—Norman B. Rainer

[57] ABSTRACT

An apparatus for securing a motorcycle within the cargo area of a pick-up truck also provides lockable cabinet-type storage space. The apparatus has two spaced apart storage compartments, the space between the compartments serving as a receiving zone for the front wheel of a motorcycle. A removable securing shaft passes through the spokes of the wheel and engages threaded fasteners disposed within each compartment. Each compartment has a lockable lid which prevents unarthorized access to the interior of the compartment and the threaded fasteners.

5 Claims, 2 Drawing Sheets 4,921,152

COMBINATION STORAGE CONTAINER AND MOTORCYCLE HOLDER

BACKGROUND OF THE INVENTION

This invention relates to the transportation of a motorcycle in the cargo area of a pick-up truck, and more particularly concerns apparatus installable into said cargo area for holding a motorcycle and providing secure cabinet-type storage space.

Owners of motorcycles may for various reasons want to transport their motorcycle to a distant location for use. Several techniques have been disclosed for loading or mounting the motorcycle onto trucks or other large vehicles. Specialized trailers are also generally used for transporting motorcycles.

Pick-up trucks, having an open cargo area behind the driver's compartment, are useful vehicles for transporting a motorcycle, especially if the motorcycle is carried erect within the cargo area. However, because the usual length of the motorcycle is comparable to the usual length of the cargo area, the motorcycle must be oriented in the director of motion of the truck. Special securing means become necessary to prevent movement of the motorcycle in the rolling and lateral directions. Since the pick-up truck may be left unattended in the course of travel, it is also necessary to provide means to prevent theft of the motorcycle.

A certain amount of specialized paraphernalia is required for the full utilization of a motorcycle. Such paraphernalia includes a safety helmet and other specialized wearing apparel, tools for maintenance and repair, spare parts, lubricants, tire changing equipment, supplies for overnight trips, and still other items. It is necessary to accommodate said items in a storage facility which affords protection against: (a) the jostling effects of road travel, (b) weather factors such as rain and snow, and (c) unauthorized use or theft. Because the motorcycle, once positioned in the cargo area, occupies a major and central portion of said area, little space is left for conventional storage boxes. Even if conventional boxes could be fitted about the motorcycle, accessibility to such boxes would be difficult.

It is accordingly an object of the present invention to provide apparatus for securing a motorcycle in erect position in the cargo area of a pick-up truck.

It is another object of this invention to provide apparatus as in the foregoing object which will prevent theft of the motorcycle.

It is a further object of the present invention to provide apparatus of the aforesaid nature having a readily accessible and protective storage facility interactive with the motorcycle.

It is a still further object of this invention to provide apparatus of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by apparatus adapted to be positioned adjacent the forward wall of the cargo area of a pick-up truck, said cargo area being further bounded by opposed parallel sidewalls and a rear tailgate, said apparatus comprising:

(a) two storage compartments joined in spaced apart mirror-image relationship about the longitudinal center axis of said cargo area, the space between said compartments defining a receiving zone, said compartments having lockable lids adapted to swing in a vertical path about hinge means adjacent said receiving zone, the interior of said compartments being accessible from the direction of said sidewalls, (b) anchoring means disposed within said receiving zone for holding the front wheel of a motorcycle, and (c) a removable securing shaft adapted to horizontally span said receiving zone in a manner such that the two extremities of the shaft are releasibly held within said compartments, said shaft being further positioned to pass through the front wheel of said motorcycle.

In certain embodiments of the invention, the storage compartments are fabricated of substantially flat panels of metal, wood, plastic or other materials resistant to weathering and breakage, and are interconnected in a manner as to form water-tight seams. In preferred embodiments, the entire apparatus may be fabricated as a monolithic structure from fiberglass-reinforced plastic as used in the manufacture of boat hulls.

One of the boundary surfaces of each compartment is preferably a flat vertical panel oriented in parallel relationship to the sidewalls of the cargo area and interiorly disposed adjacent the longitudinal center axis of the cargo area. The two compartments are disposed such that said interiorly disposed flat vertical panels are in facing relationship and thereby define the receiving zone.

The securing shaft preferably has a threaded portion on at least one extremity. The threaded portion is adapted to engage a nut or equivalent threadably interactive fastener within the compartment and adapted to tightly abut an interior surface of said flat panels.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
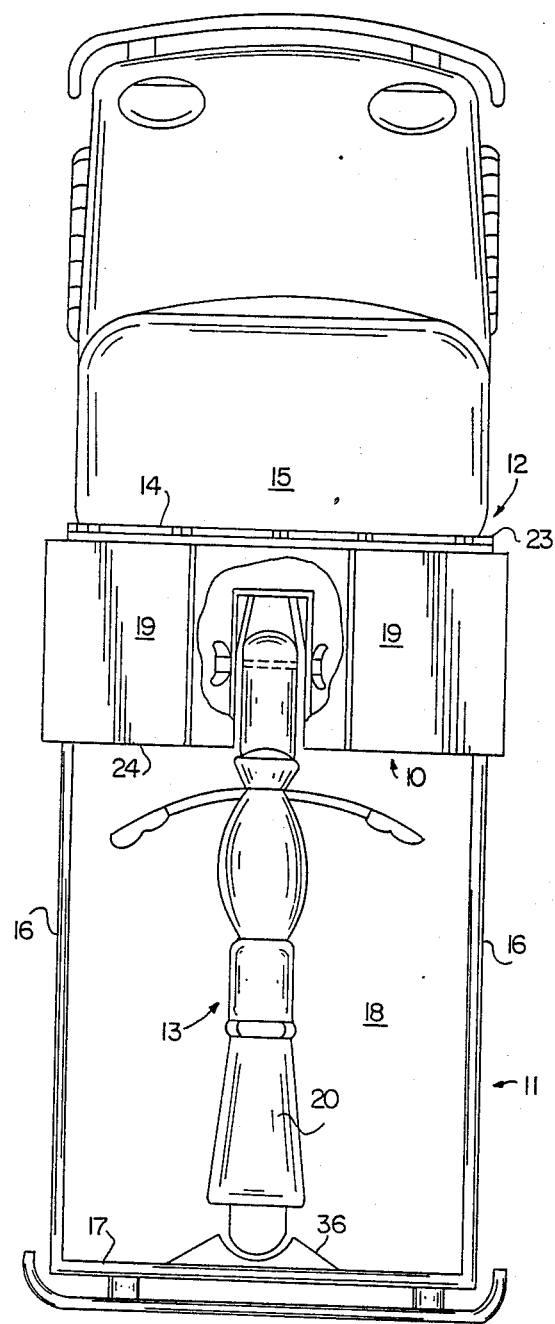
FIG. 1 is a top plan view of an embodiment of the apparatus of the present invention shown installed in the cargo area of a pick-up truck and securing a motorcycle.
Figure 2:
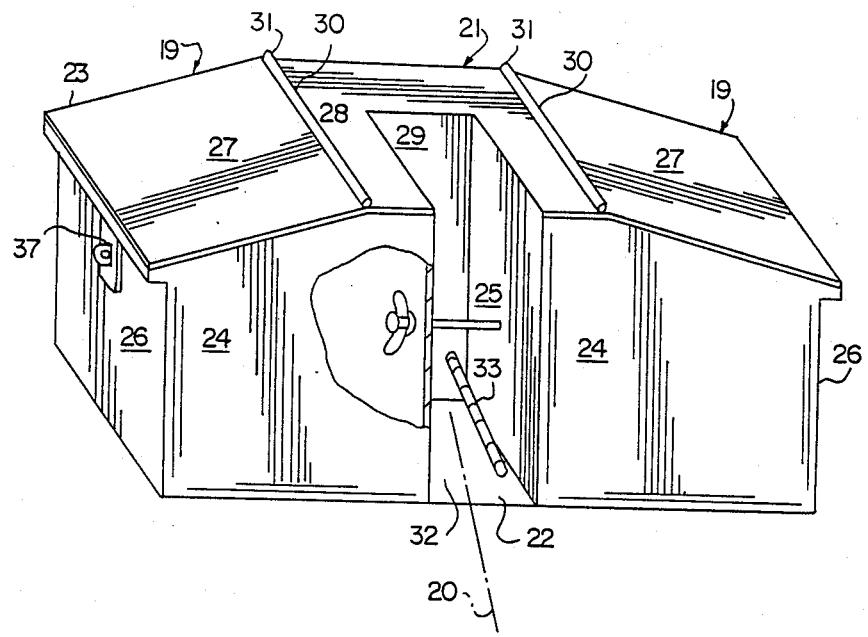
FIG. 2 is a rear perspective view of the apparatus of FIG. 1.
Figure 3:
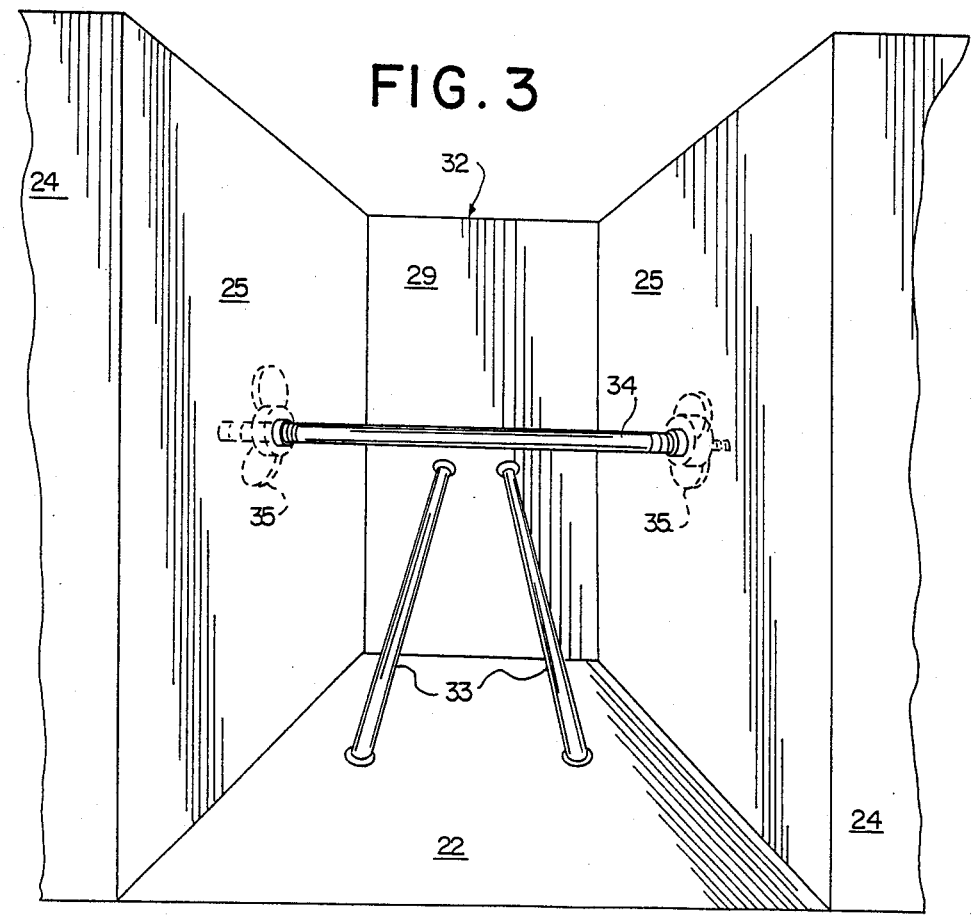
FIG. 3 is an enlarged fragmentary rear perspective view of the apparatus of FIG. 1.

Referring to FIGS. 1–3, an embodiment of the apparatus 10 of the present invention is shown positioned within the cargo area 11 of pick-up truck 12, and in functional engagement with motorcycle 13. Cargo space 11 is bounded by forward wall 14 adjacent operator's cab 15, opposed parallel sidewalls 16, rear tailgate 17, and floor 18.

Apparatus 10 is comprised of two storage compartments 19 joined in spaced apart mirror-image relationship about the longitudinal center axis 20 of said cargo area. In the exemplified embodiment, joinder of compartments 19 is achieved by a spanning compartment 21 communicating with compartments 19, and bottom panel 22 upon which compartments 19 and 21 are mounted. In other embodiments, however, the two compartments 19 may be joined by other means, including means which permit adjustable lateral spacing of the compartments.

Each compartment 19 is bounded by forward and rear panels 23 and 24, respectively, interior and exterior side panels 25 and 26, respectively, bottom panel 22, and hinged lid 27 which angles downwardly in going from the interior to the exterior side panels. The illustrated embodiment further depicts a horizontal roof portion 28 which, in conjunction with vertical transverse panel 29, defines said spanning compartment 21. Horizontal roof portion 28 terminates in straight parallel edges 30 having piano hinges 31 that attach to lids 27. Such manner of attachment of the lids permits swinging movement in a vertical plane perpendicularly disposed to axis 20.

Interior side panels 25, bottom panel 22, and transverse panel 29 define an upwardly open receiving zone 32. Forward panel 23 is adapted to abut against forward wall 14 of the cargo area, and the exterior side panels 26 are adapted to abut against the sidewalls 16 of the cargo area. The lowermost extremities of the lids overhang the respective sidewalls 16, and are equipped with a hasp 37 for a padlock, or other locking means.

By virtue of their specialized configuration and arrangement, the lids can be easily locked and unlocked by a person standing adjacent the cargo area, and the lids can be raised to achieve easy access to the interiors of the compartments.

Anchoring means in the form of paired rods 33 extend diagonally between bottom panel 22 and transverse panel 29 within receiving zone 32. The rods are spaced apart sufficiently to snugly embrace the front tire of the motorcycle.

Removable threaded securing shaft 34 horizontally spans receiving zone 32. The two extremities of shaft 34 penetrate interior panels 25, and are secured thereto by wing nuts 35. Shaft 34 is positioned such that it can penetrate between the spokes of the front wheel of the motorcycle. By virtue of such arrangement, the motorcycle is effectively secured against theft because the only access to wing nuts 35 is by way of raising the lockable lids.

A securing brace 36 may be associated with the tailgate to prevent axial or rolling movement of the bicycle. The brace is particularly effective when it causes the front tire of the motorcycle to abut against transverse panel 29.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus adapted to be positioned adjacent the forward wall of the cargo area of a pick-up truck, said cargo area being further bounded by opposed parallel sidewalls and a rear tailgate, said apparatus comprising:
    (a) two storage compartments joined in spaced apart mirror-image relationship about the longitudinal center axis of said cargo area, the space between said compartments defining a receiving zone, said compartments having lockable lids adapted to swing in a vertical path about hinge means adjacent said receiving zone and having axes parallel to said center axes, the interior of said compartments being accessible from the direction of said sidewalls,
    (b) anchoring means disposed within said receiving zone for holding the front wheel of a motorcycle, and
    (c) a removable securing shaft horizontally spanning said receiving zone in a manner such that the two extremities of the shaft are releasibly held within said compartments, said shaft being further positioned to pass through the front wheel of said motorcycle.

2. The apparatus of claim 1 fabricated of substantially flat panels of materials resistant to weathering and breakage, and interconnected to form water-tight seams.

3. The apparatus of claim 1 wherein said two storage compartments are fabricated as a monolithic structure from fiberglass-reinforced plastic.

4. The apparatus of claim 1 wherein each compartment has a flat vertical boundary surface oriented in parallel relationship to the sidewalls of the cargo area and disposed in facing relationship adjacent said center axis, thereby defining said receiving zone.

5. The apparatus of claim 4 wherein the extremities of said securing shaft perpendicularly penetrate said vertical boundary surfaces, and threadably engage wing nuts disposed within said compartments.

* * * * *